United States Patent [19]

Weis et al.

[11] Patent Number: 4,610,175

[45] Date of Patent: Sep. 9, 1986

[54] POWER TAKEOFF ASSEMBLY

[75] Inventors: Philip J. Weis, Sylvania, Ohio; Richard A. Cook, Gregory, Mich.

[73] Assignee: Dana Corporation, Toledo, Ohio

[21] Appl. No.: 577,436

[22] Filed: Feb. 6, 1984

[51] Int. Cl.$^4$ .................... F16H 37/00; F16H 57/02
[52] U.S. Cl. ................................ 74/15.86; 74/15.8; 74/606 R; 74/11
[58] Field of Search ............... 74/606 R, 15.86, 15.8, 74/11, 15.82, 15.84, 15.88; 123/DIG. 6, DIG. 7; D15/148, 149; 403/3, 4, 336, 337

[56] References Cited

U.S. PATENT DOCUMENTS

| | | | |
|---|---|---|---|
| 1,446,326 | 2/1923 | Asprooth | 74/15.86 |
| 1,557,628 | 10/1925 | Sweet | 74/15.86 |
| 2,950,635 | 8/1960 | Bieger et al. | 74/606 R |
| 3,234,808 | 2/1966 | Nelson | 74/606 R |
| 3,347,341 | 10/1967 | Aurea | 74/606 R |
| 4,174,013 | 11/1979 | Yago | 180/6.2 |
| 4,478,593 | 10/1984 | Brown | 74/606 R |

FOREIGN PATENT DOCUMENTS 1068465  5/1967  United Kingdom ............. 74/606 R

OTHER PUBLICATIONS

"Engine to Transmission Adapters" and Engine Adapter Kits, *J. C. Whitney & Co. Catalog*, 1981, pp. 163–164.

Primary Examiner—Kenneth J. Dorner
Assistant Examiner—Michael D. Bednarek
Attorney, Agent, or Firm—Emch, Schaffer, Schaub & Porcello Co.

[57] ABSTRACT

An adaptor plate assembly for use in interfacing a transmission gear housing having a standard bolt/hole pattern with a power takeoff unit having a non-standard bolt/hole pattern is disclosed. An adaptor plate is positioned between the gear housing and the power takeoff unit. The adaptor plate has passageways in alignment with standard apertures in the gear housing and with openings in the power takeoff unit. Guide and support fasteners having guide heads are initially positioned in ones of the passageways of the adaptor plate and in the housing apertures. The power takeoff unit is initially guided and supported by the guide heads. Securement fasteners are then used to complete the connection of the power takeoff unit to the adaptor plate and the gear housing.

7 Claims, 7 Drawing Figures

POWER TAKEOFF ASSEMBLY

The present invention relates to a power takeoff assembly for use in interfacing a transmission gear housing having a standard bolt/hole pattern with a power takeoff unit having a non-standard bolt/hole pattern. The design and use of power takeoff (PTO) units are well-known in the art. See for examples, Asprooth U.S. Pat. No. 1,446,326 and Sweet U.S. Pat. No. 1,557,628. Over the years the compatibility and interchangeability of PTO units which various vehicle transmission housings has been the result of an industry wide adoption of standard patterns of corresponding holes in the transmission housing and in the PTO unit itself. Two such patterns are the six-hole hexagonal pattern and the eight-hole octagonal pattern. Both of these patterns conform to standards set by the Society of Automotive Engineers. While standardization aids effective interfacing of power takeoff units with transmission housings as a whole, it also limits certain PTO unit designs. For example, installation is oftentimes difficult due to space constraints and the sometimes awkward location of the PTO unit on the side of a vehicle transmission. As a result, PTO designs have changed to increase accessibility and installation as with the low profile 271 series of CHELSEA PTO units manufactured by the Dana Corporation. To obtain this low profile design a non-S.A.E. bolt pattern must be used. In the past, this would means that such a non-standard PTO unit would not be compatible with available S.A.E. hole patterns on the transmission housings.

Consequently, it is an object of the present invention to provide a means of interfacing a non-standard mounting hole pattern on a PTO unit with a standard S.A.E. hole (bolt) pattern on a transmission housing. It is a further object of the present invention to provide a quicker means of installing and removing the PTO unit from the transmission housing.

An adaptor plate assembly according to the present invention, is disclosed for mounting a PTO unit having a non-S.A.E. bolt pattern to a transmission having a standard S.A.E. bolt pattern. This is accomplished by disposing the adapter plate assembly intermediate the transmission housing and the PTO unit. The adaptor plate assembly is provided with two sets of hole patterns. The first set is a standard S.A.E. bolt pattern corresponding to the openings in the transmission housing. The second set is a non-S.A.E. bolt pattern corresponding to certain openings provided in the PTO housing.

The adaptor plate assembly is mounted to the transmission housing by guide and support means, including fasteners located in several of the standard S.A.E. mounting holes in the adaptor plate and the transmission housing. The PTO unit is placed adjacent the adaptor plate with portions of the fasteners acting to guide and support the PTO unit against the adaptor plate assembly. Additional fasteners are then used to mount the PTO unit to the adaptor plate assembly and the transmission housing.

A more thorough understanding of the invention can be achieved through a review of the accompanying specification and drawings.

The present invention consists of an adaptor plate assembly for interfacing a power takeoff unit with a transmission housing for a drive gear mechanism, as for example, on a truck transmission.

Figure 1:
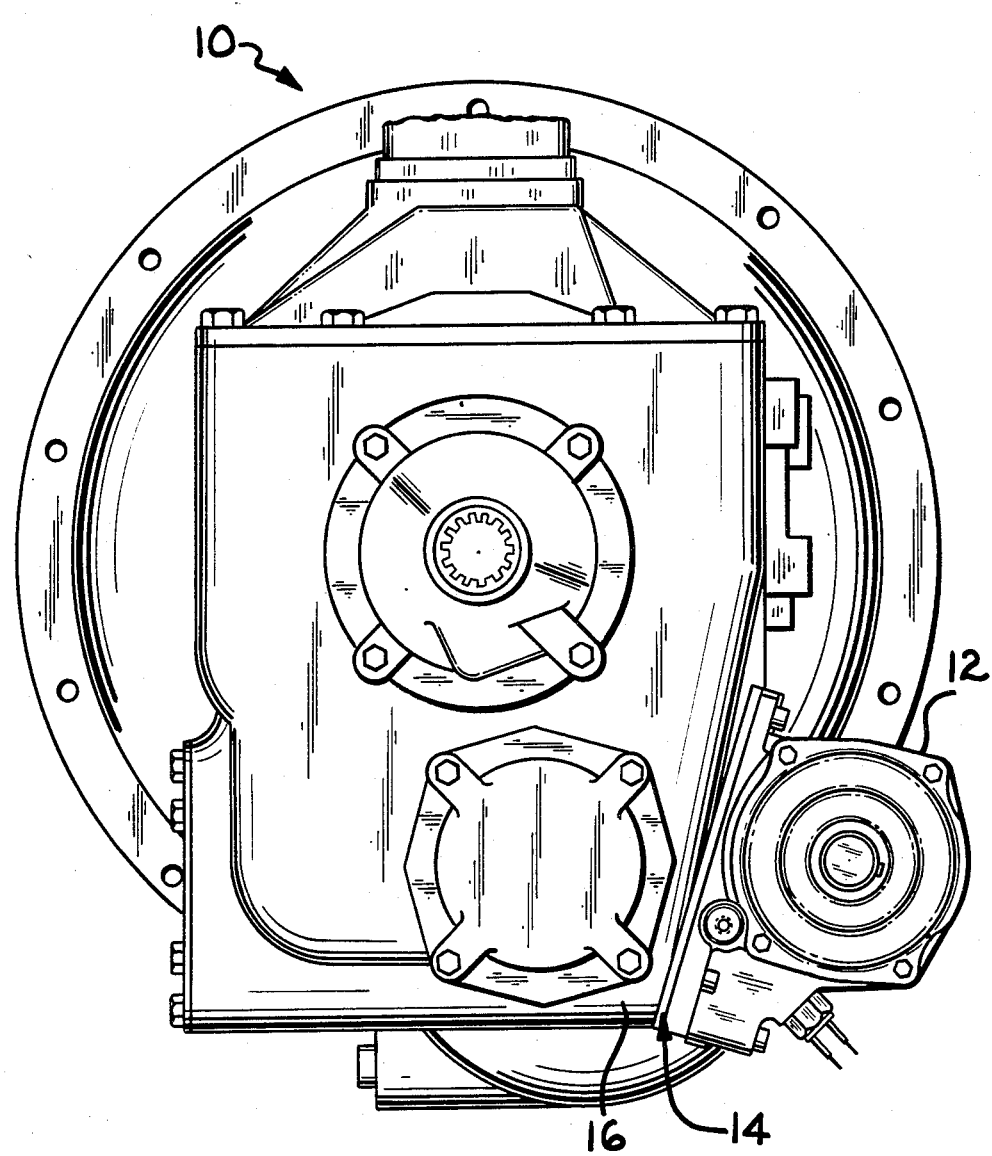
FIG. 1 is an end view of a transmission housing with a PTO unit attached to the housing via an adaptor plate assembly according to the present invention.
Figure 2:
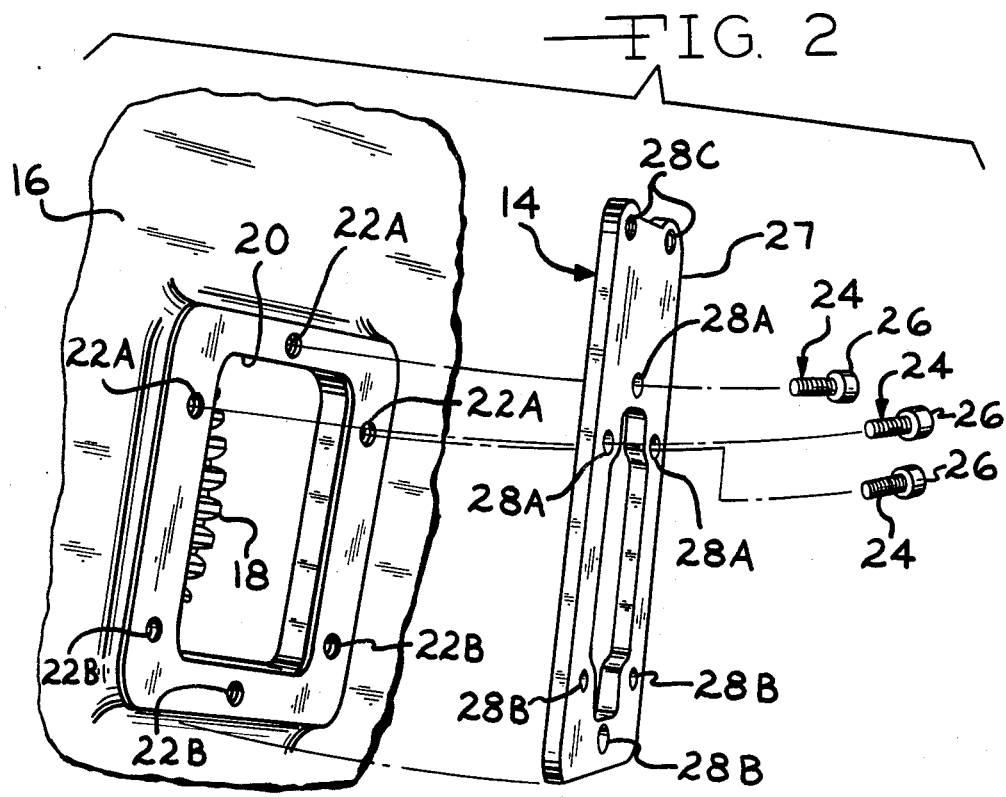
FIG. 2 is an exploded view of a transmission housing, and an adaptor plate assembly, according to the present invention.

Referring to FIGS. 1 and 2, there is shown a transmission 10, a power takeoff unit 12 and an adaptor plate assembly 14. The transmission 10 consists of a transmission housing 16 which houses a plurality of drive gears 18, one of which can be seen in FIG. 2.

The transmission housing 16 has an opening 20 which allows access to the gears 18. Normally, the opening 20 is covered by a cover plate (not shown) which is secured to the housing by a plurality of bolts which fit into a set of apertures consisting of standard threaded bolt holes 22A and 22B located around the perimeter of the housing 16. Due to the efforts of the Society of Automotive Engineers, the hole patterns on most vehicle transmissions have been standardized. One such standardized S.A.E. hole pattern is the six-hole hexagonal pattern shown in FIG. 2.

Figure 7:
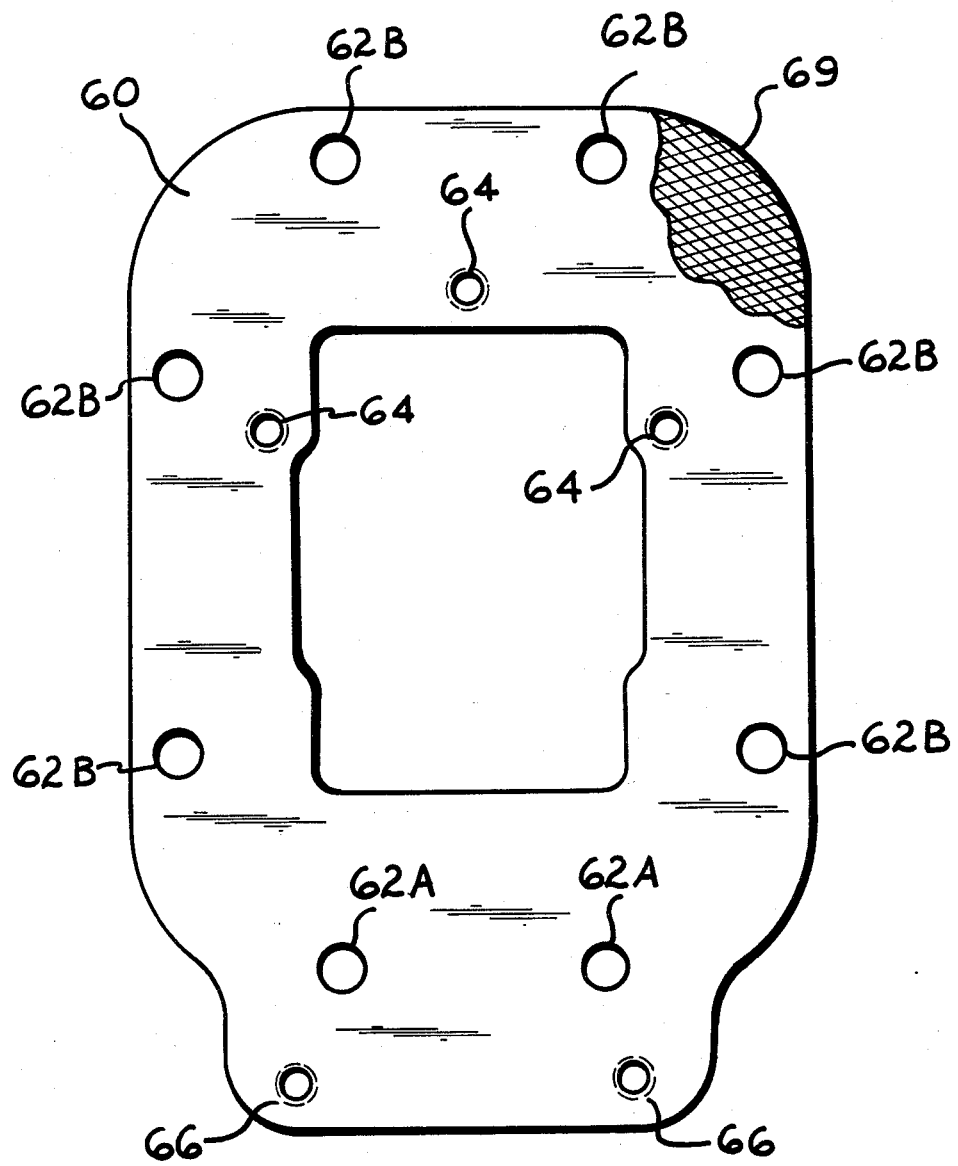
FIG. 7 is a front view of another embodiment of an adaptor plate to be used with a standard S.A.E. octagonal bolt pattern, according to the present invention.

Another embodiment of an adaptor plate assembly 60 is shown in FIG. 7. The assembly 60 is used on an another standardized hole pattern, the S.A.E. eight-hole octagonal pattern, as indicated in FIG. 7. This pattern is defined by holes 62A and 62B.

With the aid of the adaptor plate assemblies 14, 60 these same standardized hole patterns can be used to make non-standard power takeoff unit mountings compatible with transmission. housings having standard S.A.E. patterns and, furthermore, can fascilitate power takeoff installation and removal.

Figure 4:
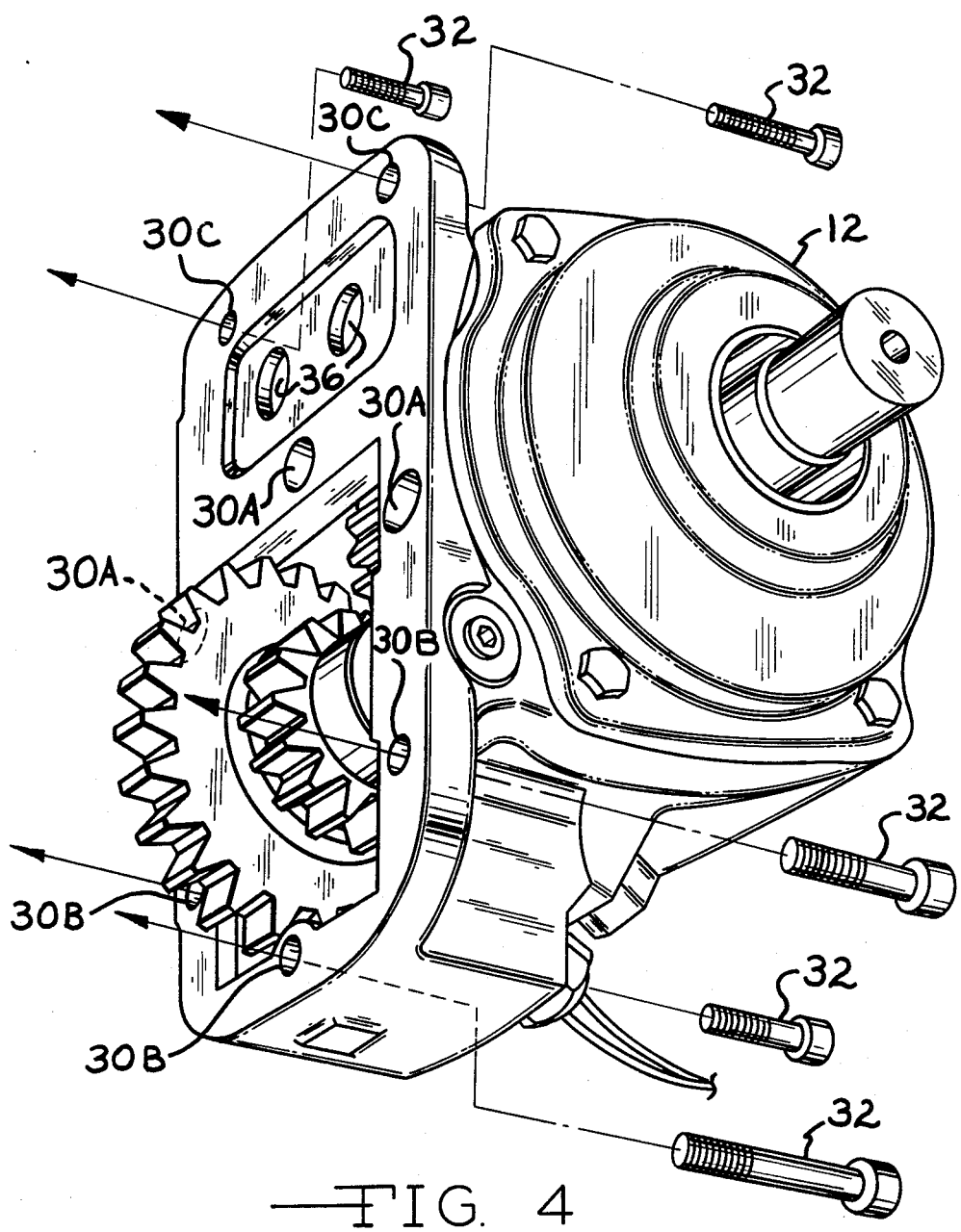
FIG. 4 is an exploded side view of a PTO unit and accompanying securement means.
Figure 6:
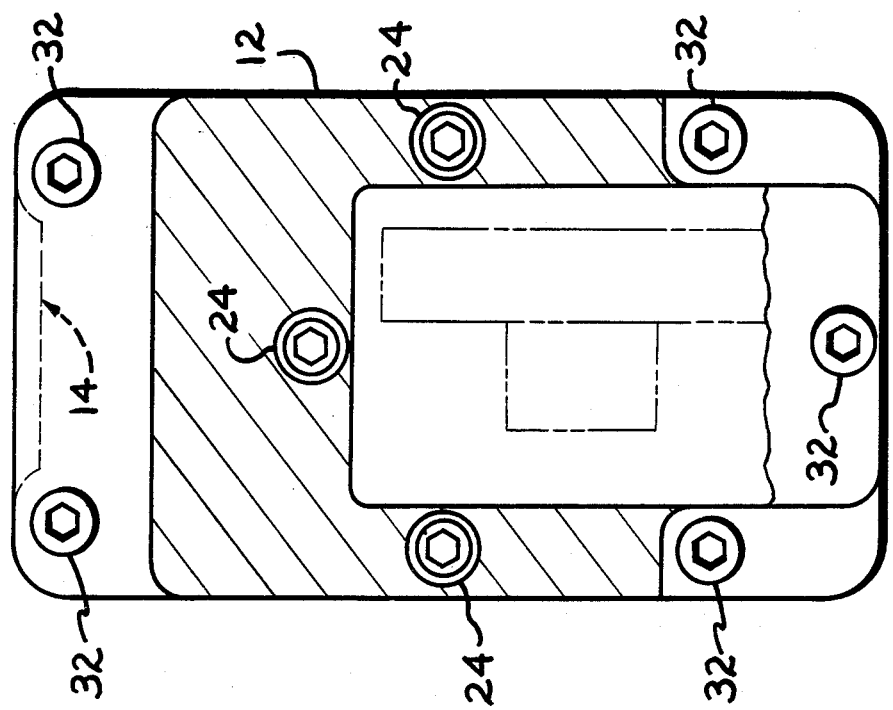
FIG. 6 is a view similar to FIG. 5 with the remainder of the securement means having been installed.

To facilitate installation of the low profile power takeoffs 12, the mounting holes in the power takeoff unit 12 are positioned to make them more accessible. As shown in FIG. 4, the power takeoff unit 12 has a plurality of first openings or recesses 30A. The recesses 30A are designed to align with the first apertures 22A in the gear housing 16. The power takeoff unit 12 also has a plurality of second openings or holes 30B which are designed to align with the second apertures 22B in the gear housing 16. Thus, the first openings 30A and second openings 30B align with the standard S.A.E. bolt/hold pattern in the gear housing 16 of transmission 10. In addition to first openings 30A and second openings 30B, the power takeoff unit 12 has a plurality of non-standard third openings 30C which do not align with either of the standard first apertures 22A or second apertures 22B in the gear housing 16. As a result of the modification in the hole pattern, however, the low profile power takeoff unit is not compatible with the existing S.A.E. standard bolt/hole patterns. The adaptor plate assembly 14 allows the interface of the non standard bolt patterns of the power takeoff units 12 with the standard bolt patterns on, for example, the transmission housing 16.

One embodiment of the adaptor plate assembly 14, according to the present invention, is shown in FIGS. 2, 3, 5 and 6. This adaptor plate assembly 14 makes the power takeoff unit 12 compatible with the transmission housing six-hole hexagonal hole pattern 22A and 22B shown in FIG. 2.

Another embodiment of the invention comprising the adaptor plate 60 is shown in FIG. 7. The adaptor plate 60 is designed to mate a power takeoff unit having a non-standard bolt pattern with a transmission housing having an eight-hole octagonal pattern. It should be understood that the present invention is not limited to the six- and eight-hole standard patterns disclosed herein but may be used with virtually any combination of hole patterns where there is a problem of interfacing the power takeoff unit with the transmission housing hole pattern.

Turning to FIG. 2, there is shown an exploded view of the gear housing 16 and the adaptor plate assembly 14. The assembly 14 includes a plurality of capscrews 24 which act as guide and support means 24. The guide and support means 24 include raised support heads 26 which are used to align and support the power takeoff unit as it is positioned on adaptor plate 27.

The adaptor plate 27 has three pluralities of holes or passageways 28A, 28B and 28C. Passageways 28A and 28B are in alignment with the standard holes or apertures 22A and 22B in the transmission housing 16. Referring to FIG. 4, passageways 28A and 28B in adaptor plate 27 are also in alignment with openings 30A, 30B in the power takeoff unit. Holes 28C in adaptor plate 27 are in alignment with additional openings 30C in the power takeoff unit 12. The openings 28C in the adaptor plate 27 are not in alignment with any of the apertures 22A or 22B in gear housing 16. Due to the symmetry of passageways 28A and 28B in adaptor plate 14 with the apertures 22A and 22B in the transmission gear housing 16, adaptor plate 27 can be installed with the non standard openings 28C in either the up or down position. In FIG. 2 the plate 27 is shown being installed in the "up" position.

To attach the plate 27 to the gear housing 16, passageways 28A in the plate 27 are aligned with apertures 22A in the gear housing 16, which are threaded to receive the guide and support means 24. Once the passageways 28A in the plate 27 and the apertures 22A in the gear housing 16 are aligned, the capscrews 24 are placed through passageways 28A and into apertures 22A. The capscrews 24 are then tightened down to initially secure the plate 27 to the gear housing 16.

Figure 3:
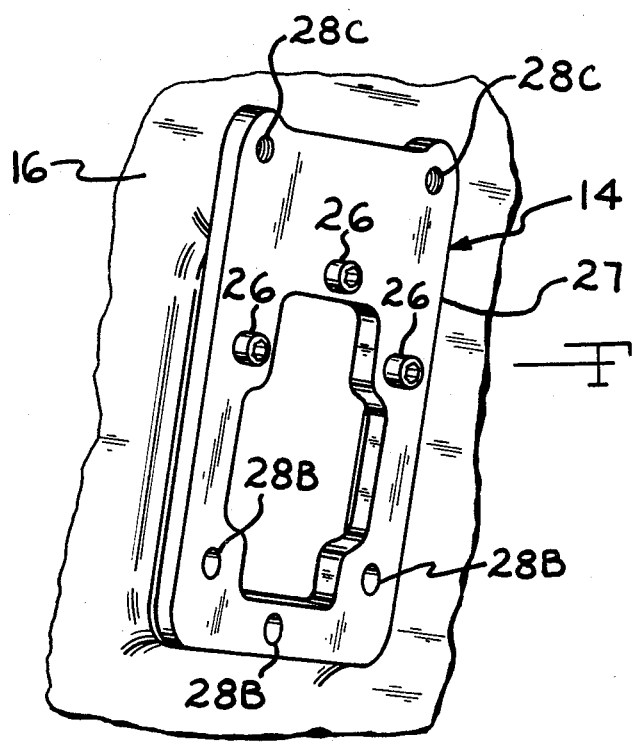
FIG. 3 is an assembled view of FIG. 2, according to the present invention.

Referring to FIG. 3 the support heads 26 of the capscrews 24 extend outwardly from the plate 27 in a direction away from gear housing 16.

Referring to FIG. 4, the first openings 30A of the power takeoff unit 12 receive the support heads 26 of guide and support means 24, thereby supporting the unit 12 on the plate 27 and properly aligning the remaining second openings 30B and third openings 30C in the power takeoff unit 12 with the corresponding passageways 28B and 28C in the adaptor plate 27.

Figure 5:
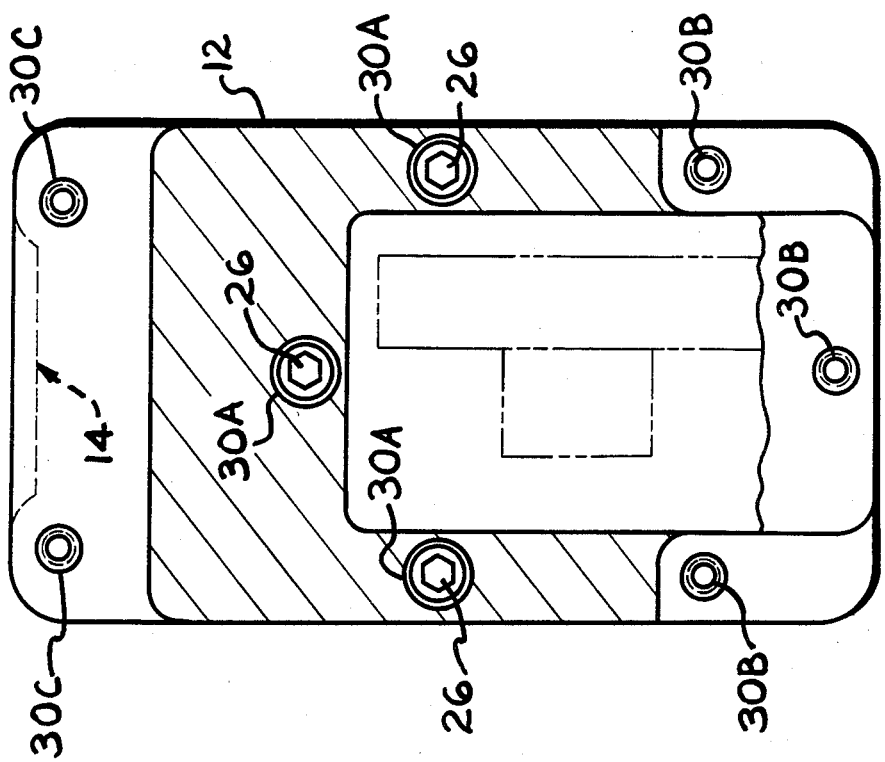
FIG. 5 is an end view of a PTO unit, partially in section, aligned on the adaptor plate through the use of the guide and support means, according to the present invention.

Referring to FIG. 5, once the power takeoff unit 12 is positioned adjacent the adaptor plate 27 such that the support heads 26 are received within the openings 30A, the remainder of the holes in the housing 16, plate 27 and power takeoff unit 12 are properly aligned.

Having aligned the respsective holes, securement members such as capscrews 32 are next positioned through the openings 30B in the power takeoff unit 12 and screwed into the threaded apertures 22B in gear housing 16 thus securing the base of the power takeoff unit 12 and the adaptor plate 27 to the gear housing 16.

Finally, additional securement capscrews 32 are placed through the openings 30C in the power takeoff unit 12 and are then screwed into the threaded passageways 28C in the adaptor plate 27. This secures the top portion of the power takeoff unit 12 to the adaptor plate 27 and completes the installation procedure.

As noted above, FIG. 7 depicts another adaptor plate assembly 60, according to the present invention, which is designed for use with housings that have a standard S.A.E. octagonal bolt pattern. The adaptor plate assembly 60 may be used to mount the power takeoff unit 12 to the housing (not shown) having the standard octagonal pattern. Holes or passageways 64 and 66 in the plate assembly 60 are threaded and designed to align with openings or holes 30B and 30C respectively in the power takeoff unit 12. Finally, the power takeoff unit 12 shown in FIG. 4 defines two recesses or openings 36 which will receive guide and support means (not shown) protruding from the passageways 62A in adapter plate assembly 60. The adaptor plate 60 includes passageways 62A and 62B. The passageways 62A and 62B are aligned with corresponding apertures defined in the gear housing 16 (not shown).

To install the power takeoff unit 12, the adaptor plate of the assembly 60 is first bolted to the housing (not shown) by way of securement means such as capscrews (not shown) positioned through the eight holes 62A and 62B into the standard eight-hole patterns of the gear housing 16. The power takeoff unit 12 is then placed on the adaptor plate of the assembly 60 so that the heads of the capscrews located in holes 62A frictionally engage recesses 36 located in the power takeoff unit 12. As with the adapter plate assembly 14 in FIG. 3, the heads located at holes 62A act to guide and support the power takeoff unit 12 when it is positioned against adaptor plate of the assembly 60. Once in place, the power takeoff unit 12 is then secured to the adaptor plate of the assembly 60 by way of securement fasteners, such as capscrews, which pass through openings or holes 30B and 30C in the power takeoff unit 12 (FIG. 4) and are secured to the threaded holes 64 and 66 in adaptor plate of the assembly 60.

A seal 69 is normally positioned between the transmission housing 16 and the adaptor plate 14 and/or between the adaptor plate 14 and the power takeoff unit 12. The seal can be a gasket, (as indicated in FIG. 7); gasket cement or any other suitable seal material which will retard fluid leakage.

From the above it is evident that the adaptor plate assembly according to the present invention provides a fast and highly effective method for attaching a power takeoff unit with a non-standard bolt pattern to a transmission that has a standard bolt pattern. It should be understood that various modifications may be made in the present embodiments without departing from the scope and content of the following claims.

We claim:

1. In an adaptor plate assembly for interfacing a power takeoff unit with a transmission, said power takeoff having a plurality of first openings and a plurality of second openings for receiving securement means, said transmission having a housing, said housing having an opening for operatively receiving said power takeoff unit, a plurality of apertures positioned around said opening in said housing, the improvement comprising:

an adaptor plate for positioning intermediate said power takeoff unit and said housing, said adaptor plate having a plurality of first passageways in alignment with said apertures in said housing, said adaptor plate having a plurality of second passageways in alignment with said second openings in said power takeoff unit, a plurality of guide and support means having an outwardly extending portion positioned in a portion of said passageways, said outwardly extending portion of said guide and support means aligning and supporting said power takeoff unit adjacent said adaptor plate, securement means positioned in ones of said first and second openings in said power takeoff unit, whereby said securement means rigidly secure said power takeoff unit and said adaptor plate to said housing.

2. In an adaptor plate assembly for interfacing a power takeoff unit with a transmission, said power takeoff having a plurality of first openings and a plurality of second openings for receiving securement means, said transmission having a housing, said housing having an opening for operatively receiving said power takeoff unit and a plurality of apertures positioned around said opening in said housing, the improvement comprising:

an adaptor plate for positioning intermediate said power takeoff unit and said housing, said adaptor plate having a plurality of first passageways in alignment with said apertures in said housing and said first openings in said power takeoff unit, said adaptor plate having a plurality of second passageways in alignment with said second openings in said power takeoff unit, said second passageways not being in alignment with said apertures in said housing, a plurality of guide and support means having an outwardly extending portion positioned in said first passageways, said outwardly extending portion of said guide and support means aligning and supporting said power takeoff unit adjacent said adaptor plate, securement means positioned in a portion of said first openings and in said second openings in said power takeoff unit, whereby said securement means rigidly secure sad power takeoff unit and said adaptor plate to said housing.

3. An adaptor plate assembly according to claim 2 including sealing means positioned between said housing and said adaptor palte and between said adaptor plate and said power takeoff unit.

4. The combination of a power takeoff unit, a housing for the drive gears of a vehicle, and an adaptor plate assembly for connecting the power takeoff unit to the housing for the drive gears of a vehicle, such housing defining an recess, said recess being disposed for operatively receiving such power takeoff unit, a plurality of first apertures positioned around such recess in such housing, a plurality of second apertures positioned around such recess in such housing, such power takeoff unit operatively connected to said drive gears in said housing, such power takeoff unit defining a plurality of first openings, such first openings being disposed in alignment with such first apertures in such housing, said adaptor plate assembly comprising an adaptor plate positioned adjacent such recess in said housing, said adaptor plate having a plurality of first passageways, a plurality of second passageways and a plurality of third passageways passing through said plate, said first passageways being in alignment with such first apertures positioned around such recess in such housing and said second passageways being disposed to be in alignment with such second apertures positioned around such recess in such housing, guide and support means being positioned in said first passageways in said plate and extending into such first apertures around such recess in said housing to secure said plate to such housing, said guide and support means having support heads that project from said plate in a direction away from such housing, such first openings of such power takeoff unit receiving said support heads of said guide and support means, said support heads acting to position and support such power takeoff unit on said adaptor plate, such power takeoff unit defining a plurality of second openings, such second openings being disposed in alignment with such second apertures in such housing, such second openings being disposed for receiving securement means, said securement means extending into such second apertures in said housing to secure such power takeoff unit and said adaptor plate to such housing, such power takeoff unit defining a plurality of third openings, said third openings being disposed in alignment with said third passageways in said adaptor plate, said third openings being disposed for receiving said securement means, said securement means extending into said third passageways in said plate to assist in securing said power takeoff unit to said adaptor plate.

5. An adaptor plate assembly for a power takeoff unit according to claim 4 wherein sealing means are positioned between such housing and said adaptor plate and between said adaptor plate and such power takeoff unit.

6. The combination of a power takeoff unit, a housing for the drive gears of a vehicle, and an adaptor plate assembly for connecting the takeoff unit to the housing for the drive gears of a vehicle, such housing defining a recess, said recess being disposed for operatively receiving such power takeoff unit, a plurality of first apertures positioned around such recess in such housing, a plurality of second apertures positioned around such recess in such housing, such power takeoff unit being operatively connected to said drive gears in said housing, such power takeoff unit defining a plurality of sets of openings, said adaptor plate assembly comprising an adaptor plate positioned adjacent such recess in said housing, said adaptor plate having a plurality of first passageways, a plurality of second passageways and a plurality of third passageways passing through said plate, said first passageways being in alignment with such first apertures positioned around such recess in such housing and said second passageways being disposed to be in alignment with such second apertures positioned around such recess in such housing, first mounting means being positioned in said first passageways in said plate and extending into such first apertures around such recess in said housing to secure said plate to such housing, one set of openings of such power takeoff unit being in alignment with such second passageways in said adaptor plate and also with said second apertures in such housing, second mounting means positioned in such one set of openings, through such second passageways in said plate and extending into such second apertures in said housing to secure such power takeoff unit to said adaptor plate and to such housing, said third passageways in said plate being in alignment with another set of openings of such power takeoff unit and third mounting means positioned in such other set of openings and into said third passageways to secure such power takeoff unit only to said adaptor plate.

7. An adaptor plate assembly according to claim 6, wherein such power takeoff unit defines a plurality of recesses adjacent said adaptor plate, said first mounting means comprising a plurality of bolts having support heads at one end, said support heads projecting from said adaptor plate and being received by such plurality of recesses of such power takeoff unit, whereby said support heads guide such power takeoff unit onto said adaptor plate.

* * * * *